(12) United States Patent
Elmore et al.

(10) Patent No.: US 6,351,786 B2
(45) Date of Patent: *Feb. 26, 2002

(54) VXI BACKPLANE SYSTEM IMPROVEMENTS AND METHODS

(75) Inventors: Timothy D. Elmore, Cypress; Allan Knox, II, Moreno Valley; Daniel C. Masters, Mission Viejo; Michael L. Stockwell, Lake Forest; Joseph R. Talbert, Murrieta, all of CA (US)

(73) Assignee: Racal Instruments, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/138,972

(22) Filed: Aug. 24, 1998

(51) Int. Cl.[7] ............................................. G06F 13/00
(52) U.S. Cl. ...................... 710/303; 710/300; 710/301
(58) Field of Search ................................. 361/732, 725, 361/726, 801, 802, 754; 439/325, 327, 157, 160; 710/101, 102, 104, 129, 303, 300, 301, 302, 304, 305

(56) References Cited

U.S. PATENT DOCUMENTS

| | | |
|---|---|---|
| 3,335,386 A | 8/1967 | Upton |
| 3,767,974 A | 10/1973 | Donovan |
| 4,152,750 A | 5/1979 | Bremenour et al. |
| 4,628,413 A | 12/1986 | Speraw |
| 4,761,661 A | 8/1988 | Negishi |
| 4,777,615 A | 10/1988 | Potash |
| 4,914,552 A | 4/1990 | Keemer |
| 5,003,431 A | 3/1991 | Imsdahl |
| 5,032,951 A | 7/1991 | Schropp et al. |
| 5,321,962 A | 6/1994 | Ferchau et al. |
| 5,333,097 A | 7/1994 | Christensen et al. |
| 5,339,221 A | 8/1994 | Conroy-Wass et al. |
| 5,340,340 A | 8/1994 | Hastings et al. |
| 5,348,482 A | 9/1994 | Rudy, Jr. et al. |
| 5,349,689 A | 9/1994 | Suzuki |
| 5,371,749 A | 12/1994 | Tsuda |
| 5,446,621 A | 8/1995 | Jansen et al. |

(List continued on next page.)

Primary Examiner—Robert Beausoliel
Assistant Examiner—Tim Vo
(74) Attorney, Agent, or Firm—William A. Newton

(57) ABSTRACT

A VXI product plug-in is provided herein that is capable of higher component density. The plug-in is configured to occupy two standard size slots of a standard VXI chassis, and includes two sets of three horizontally stacked modules in upper and lower sub-compartments of a front compartment of the plug-in carrier. The six modules have the capability of being populated with 480 switching relays, which provides for a 50 percent increase in the number of switches over the prior art plug-ins. The plug-in carrier includes a rear compartment that houses a VXI bus interfacing circuit, including a mezzanine board, a bridge board, and optionally a controller board, for interfacing the switch modules with a VXI backplane bus. The Plug-in further includes an internal backplane situated within the carrier between the front and rear compartments that provides an interface between the modules and the VXI bus interfacing circuit, and specifically, include a bus that can selectively couple modules together. Other aspects of the invention include an automatic updating scheme for updating the software installed on the controller card so that it has the necessary data and program code to operate new modules, an emergency reset mechanism for opening all relays pertinent to one module, and a mechanism for facilitating the insertion and removal of a VXI plug-in to and from a VXI chassis.

20 Claims, 16 Drawing Sheets

U.S. PATENT DOCUMENTS

| | | |
|---|---|---|
| 5,483,419 A | 1/1996 | Kaczeus, Sr. et al. |
| 5,513,079 A | 4/1996 | Millard |
| 5,530,302 A | 6/1996 | Hamre et al. |
| 5,557,205 A | 9/1996 | Hwang et al. |
| 5,557,506 A | 9/1996 | Wood et al. |
| 5,608,882 A | 3/1997 | Abert et al. |
| 5,621,890 A | 4/1997 | Notarianni et al. |
| 5,625,238 A | 4/1997 | Ady et al. |
| 5,628,028 A | 5/1997 | Michelson |
| 5,678,063 A | 10/1997 | Odom et al. |
| 5,689,406 A | 11/1997 | Wood et al. |
| 5,717,614 A * | 2/1998 | Shah et al. .................. 364/579 |
| 5,729,060 A | 3/1998 | Shih |
| 5,778,203 A | 7/1998 | Birkedahl et al. |
| 5,781,798 A | 7/1998 | Beatty et al. |
| 5,784,576 A | 7/1998 | Guthrie et al. |
| 5,787,261 A | 7/1998 | Osaka et al. |
| 5,793,614 A * | 8/1998 | Tollbom ..................... 361/732 |
| 5,816,673 A | 10/1998 | Sauer et al. |
| 5,903,146 A * | 5/1999 | Wang ....................... 324/158.1 |
| 5,995,376 A * | 11/1999 | Shultz et al. ............... 361/788 |

* cited by examiner

VXI BACKPLANE SYSTEM IMPROVEMENTS AND METHODS

FIELD OF THE INVENTION

This invention relates to Versa-Module European (VME) Extensions for Instrumentation (VXI) based systems and products, and in particular, to an apparatus and method for configuring a VXI product plug-in to increase product component density, to an apparatus and method for facilitating the insertion and removal of VXI product carriers into and out of a standard VXI chassis, to an apparatus and method for facilitating the interfacing of new VXI products with a controller of VXI backplane systems, to an apparatus and method for providing an internal bus for selectively coupling VXI product modules, to a method and apparatus for providing an emergency reset mechanism to protect VXI product modules individually or together from potentially hazardous conditions, and to a method and apparatus for providing electromagnetic shielding between VXI product modules.

BACKGROUND OF THE INVENTION

The VXI bus is a standard computer interface bus that originated in Europe, but has been widely accepted around the World. Its primary use has been in the testing and diagnostic field. For instance, it has been used for testing and troubleshooting of automobile components, medical devices such as pacemakers, computer-based systems, and microprocessor integrated circuits. Because of their testing and diagnostic capabilities, VXI bus systems typically comprise a plurality of switching modules. These switching modules connect to a unit-under-test (UUT) for testing and diagnostic purposes. A computer controller interfaces with the VXI backplane system to operate the switch modules in accordance with a testing and diagnostic strategy.

The VXI standard includes numerous specification requirements. These specifications include, for example, chassis size and configuration requirements, power requirements, cooling requirements, backplane protocol requirements, and connector requirements, to name a few. Typically, designers of VXI products must adhere strictly to the required specifications of the VXI backplane system. Of particular interest to the invention is the VXI chassis slot configuration requirements.

FIG. 1 illustrates a simplified representation of the front face of a standard VXI chassis 100 of a VXI based system that is used in the prior art. The standard VXI chassis 100 includes a plurality of standard size slots 102 for respectively receiving therein VXI product plug-in 104 that connect to a VXI backplane bus situated at the back of the chassis (not shown in FIG. 1). FIG. 1 illustrates a representative sample of two (2) adjacent slots 102 for housing therein two adjacent VXI product plug-ins 104. A computer (not shown) can communicate with the VXI product plug-ins 104 by way of the VXI backplane bus through the use of a standard connector 106 located on an adapter module 107 typically positioned within the left-most slot of the chassis 100. The VXI product plug-ins 104 each include a housing 108 that is sized and dimensioned to slide into respective slots 102. A module card 110 is contained within each of the housings 108 for performing particular programmable functions. These modules may perform many types of operations, but for the purpose of this application, switch modules will serve to illustrate the invention.

As previously discussed, there are standard size and configuration specifications for the VXI chassis 100. One of the specifications include slot width and length requirements. Thus, designers of VXI products typically design a plug-in so that it is sized and dimensioned to slide into one of these standardized slots. Accordingly, a VXI product designer is somewhat restricted as to the available area for implementing the desired function(s) for the VXI product plug-in. This typically limits the number of components that can be incorporated into a plug-in. If the products are programmable switching networks, the slot size requirements may limit the number of switches that can be incorporated into a VXI product plug-in.

FIG. 2 illustrates a block diagram of a prior art VXI based system 120 including a pair of VXI switching product plug-ins 130 and 132 positioned within respective VXI chassis slots (not shown in FIG. 2) and connected to a VXI backplane bus 142. The VXI switching plug-ins 130 and 132 include respective carrier housings 134 and 136 (represented by a dashed box) that houses respective pairs of switch cards 138 and 140. The switching cards 138 and 140 include respective connectors situated at the back side of the carriers in a manner that when the plug-ins are slid into corresponding slots of the VXI chassis, the connectors make operational contact with corresponding connectors on the VXI backplane bus 142. As it is typical of a VXI bus configuration, it includes lines for supplying power, lines for providing VXI signals, and non-designated lines for custom usage by a designer. The non-designated lines of a VXI backplane bus 142 are typically referred to as the local bus, and will be abbreviated herein as "LBUS."

Each of the prior art switch module cards 138 and 140 include a plurality of functional circuitry. For instance, they include respective address selector switches and associated circuitry so that the switch modules are separately identified. They also each include a VXI signal decoding circuit for interpreting the commands received from the LBUS. In addition, they each include a differential driver receiver, which is required for receiving the signals from the LBUS. The local bus LBUS comprises a plurality of non-connected segments which may be connected respectively to each of the switching modules. The switching modules each include LBUS Jumper switches in order to cascade or daisy-chain the switching modules. In the diagram shown in FIG. 2, the LBUS jumper switches when set connects LBUS IN to LBUS OUT. Each switching module includes a switching bank, typically made of an array of relays and associated interfacing circuitry.

At least one of the switch modules incorporated into the VXI based system 120 should include a controller circuit, such as controller circuit 144 present in switch module 138. The controller circuit receives the commands or VXI bus signals from the VXI backplane bus 142, and decodes these signals in order to issue address and data information for all of the modules connected to the LBUS. The address and data information issued by the controller 144 are directly applied to the switch module 138 card that incorporates the controller, or indirectly to the other modules, such as module 140, through the LBUS, which may be cascaded or daisy-chained as previously discussed. If all the modules are cascaded in the VXI based system, every module will receive the address and data information issued by the controller, and the addressed module or modules will respond accordingly.

Referring now to both FIGS. 1 and 2, the prior art VXI based system does not utilize the available slot area of the VXI chassis 100 in the most efficient manner. For instance, each adjacent pair of plug-ins in the system has an unavailable or wasted region 112 between adjacent plug-ins 104

(shown much larger than it really is for the sake of viewing). In addition, there is substantial unnecessary redundancy in each of the switching cards 138 and 140 by the inclusion in each of the cards an address range switch, VXI signal decoding circuit, a differential driver receiver, a power filtering circuit, and LBUS jumper switches, which would not be duplicated if the modules were in one integral package. With this unnecessary redundancy, existing prior art switch modules are limited to switching banks of approximately 160 switching relays. Thus, a total of about 320 switching relays can be accommodated by two adjacent slots 102. Currently, there is a demand for more relays within that space.

Thus, there is a need to reconfigure the existing design of the prior art VXI based system to reduce the amount of wasted space and unnecessary circuit redundancy so that a higher density of components, such as switching relays, can be achieved within the size parameters specified for the standard VXI chassis.

There are additional needs for providing a higher component density for the available slot size. These needs include facilitating the insertion and removal of VXI product plug-ins into and out-of a standard VXI chassis, facilitating the interfacing of new VXI products with controllers of existing VXI based systems, providing a programmable internal bus for selectively coupling VXI product modules, providing an emergency reset mechanism to protect VXI product modules individually or together from potentially hazard conditions, and providing electromagnetic shielding between VXI submodules that occupy the same VXI bus module.

SUMMARY OF THE INVENTION

One general objective of the invention is to provide more components within the existing parameters of a VXI based system. If the VXI based systems and products are used for testing and diagnostic applications, where the product plug-ins are primarily switch cards, then it is an objective of the invention to provide more switching components per a given area allotted in a standard VXI based system. An apparatus and method is provided herein for accomplishing these objectives. The concept involves providing a VXI product plug-in module that is sized and dimensioned to occupy two adjacent standard size slots in a standard VXI chassis. By doing so, the VXI product plug-in takes advantage of the wasted space between two adjacent single-slot plug-ins that would be undesirably present in a prior art VXI based system.

More specifically, the VXI product plug-in in accordance with the invention comprises a carrier housing partitioned into a front compartment and a rear compartment. The front compartment is further partitioned into an upper sub-compartment and a lower sub-compartment. Both of the upper and lower sub-compartments are preferably configured to house three horizontally-stacked module cards. Thus, for a two standard size slot area, the VXI product plug-in of the invention provides six module cards. In the present design, one of these module cards can house a bank of 80 switching relays, in the case where the module card is of a switching type. Since there is space for six switch modules for each plug-in, a total of 480 switching relays can be provided within two adjacent standard size slots of a standard VXI chassis. Whereas, in the prior art VXI based system, two prior art VXI switching plug-ins situated within two adjacent standard size slots, can house a total of 320 switching relays (160 switching relays per prior art plug-in).

Thus, the VXI product plug-in of the invention provides a 50 percent increase in the switching relay density over that of the prior art plug-in. This is a substantial advantage since there is a demand for higher component density for VXI based systems and products.

Since a plurality of the modules, preferably six, are housed within compartments of the VXI plug-in carrier housing, there is a need to provide electromagnetic isolation between the modules to prevent interference or cross-talk between the modules. Accordingly, a thin sheet of electrically conducting material is provided between adjacent modules that preferably extends throughout the board length and height of the module. The thin conductive sheet is connected to a grounding plane on an internal backplane of the plug-in.

The rear compartment of the plug-in carrier in accordance with the invention houses a circuit for interfacing a VXI backplane bus with the modules occupying the front compartment of the carrier. Specifically, the interfacing circuit preferably comprises a mezzanine board, a bridge board, and optionally a controller board. More specifically, the mezzanine board interfaces with the VXI backplane bus to provide filtering of the VXI bus power lines and to provide these lines to the switch modules and the controller card. The controller card interfaces with the VXI backplane bus in order to decode or interpret data received from the VXI bus along the VXI signal lines, and to issue address and data information that are provided to the VXI modules along the local bus (LBUS) of the VXI backplane bus. The controller card has the capability of operating in a message based mode, using for example the IEEE 488.2 protocol or the Small Computer Programming Instruction (SCPI) protocol. In addition, the controller card has the capability of operating in a register based mode for increase throughput.

The bridge board interfaces with the VXI backplane bus to receive the address and data information issued by the controller card along the local bus (LBUS) of the VXI bus, and issues address, data and handshake signals for the six (6) VXI modules in data communication with the corresponding bridge card. A VXI based system need only have one plug-in that incorporates the controller card. The other plug-ins of the system can receive the addressing and operating instructions from the controller board by way of the local bus (LBUS), which can be configured in a daisy-chain manner for providing a connection between the controller card and potentially all the plug-ins sharing the VXI bus.

The VXI plug-in of the invention further includes an internal backplane bus that is preferably situated within the carrier between the front and rear compartments. It provides an interface between the mezzanine and bridge boards occupying the rear compartment, and the switch modules occupying the front compartment of the carrier. The internal backplane bus includes power busses that interface with the power lines of the mezzanine and bridge boards, and power lines of the switch modules. In addition, the internal backplane includes a programmable bus, referred to herein as the analog bus, configured in accordance with an aspect of the invention so that the six modules can be selectively coupled together in many combinations. In the preferred embodiment, the analog bus includes six module interfaces that are cascaded together by four independent differential signal busses. Each segment of the independent differential bus that couples adjacent module interfaces includes a series-connected relay switch housed by each of the six modules for selectively coupling the adjacent module interfaces. The relays can be set in a particular manner so that a desired connection is made between two or more selected modules.

Another aspect of the invention is to provide a mechanism for facilitating the insertion and removal of the VXI product plug-in card to and from the VXI chassis. This is accomplished by a pair of injection/ejection mechanisms that are pivotably coupled to the top and bottom of the carrier housing. The injection/ejection mechanism preferably includes a handle integrally attached to a pivot member having a bulb-shaped opening or hole centered at the pivot point and sized and dimensioned to receive a pin or the like to pivotably mount the mechanism to a carrier member. The pivot member includes an injection and ejection protrusion configured to contact a frame structure of the standard VXI chassis (designated herein as a "card guide rail") during the operation of the mechanism. During insertion of the plug-in into the VXI chassis, when the plug-in connectors make contact with the mating connectors of the VXI backplane, the injection/ejection mechanism is rotated so that the injection protrusion is forced against an injection lip on the card guide rail. This action essentially pulls the plug-in forward so that the connectors of the plug-in and the VXI backplane mate and are in a friction fit relationship. During removal of the plug-in, the injection/ejection mechanism is rotated in an opposite manner so that the ejection protrusion is forced against an end of the card guide rail. This action essentially pushes the plug-in backwards so that the connectors of the plug-in and the VXI backplane are no longer in a mating and friction fit relationship.

Yet another aspect of the invention is to provide the capability of making new decoding routines available to the controller card so that the controller card is capable of communicating with new designed VXI product modules without the need for revised firmware. In order to accomplish this objective, a VXI product plug-in module is provided with descriptor data and program routines stored on a local memory, preferably an electrically programmable read only memory (EPROM) or the like, that can be uploaded to and executed by a processor on the controller card so that the controller card has the necessary information for communicating with the module. Upon system start-up, the controller card uploads the descriptor data and program routines stored in the local memory of the module and stores it preferably in a random access memory (RAM). The processor on the controller card can then refer to the descriptor data and execute the uploaded program routines in order to issue proper addressing and operating instructions for the new module.

Yet another aspect of the invention is to provide an emergency reset mechanism for a switching module that allows a user to open all the switching relays in the module by simply operating an externally provided switch. This is of value when a hazard condition exists that requires the user to quickly respond to a hazardous condition. The emergency reset mechanism can control the opening of the switches within a single module, without opening the switches in other modules or plug-ins. This allows for other test and diagnostic procedures to run on other modules, even though an emergency condition has occurred. The module also includes a jumper that when set, couples the emergency reset mechanism of one module to the other modules sharing the local bus (LBUS) of the VXI backplane bus to open all the switches on all modules.

DETAILED DESCRIPTION OF THE PREFERRED EMBODIMENTS

Figure 1:
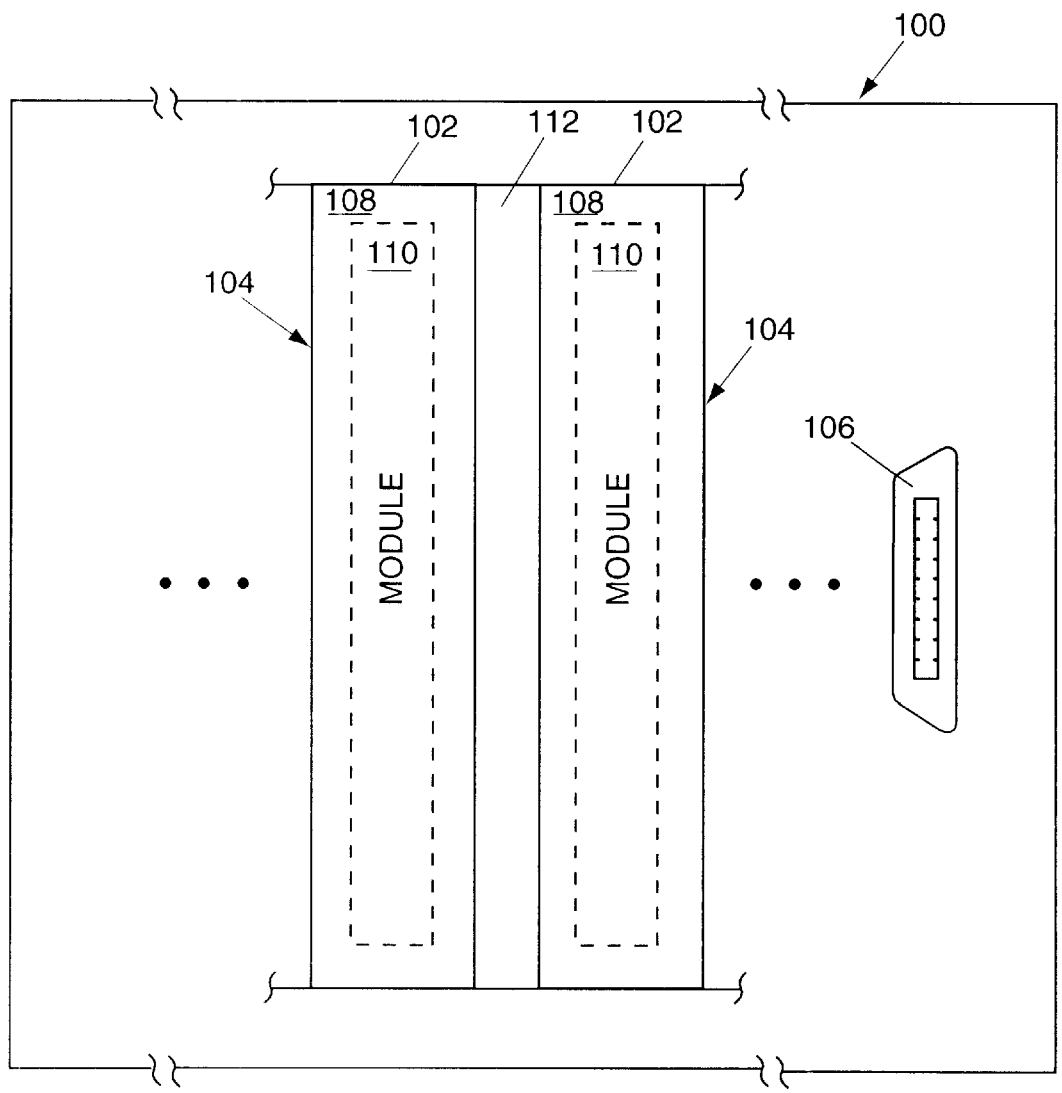
FIG. 1 illustrates a simplified representation of a front face of a standard VXI chassis of a VXI based system that is used in the prior art.
Figure 2:
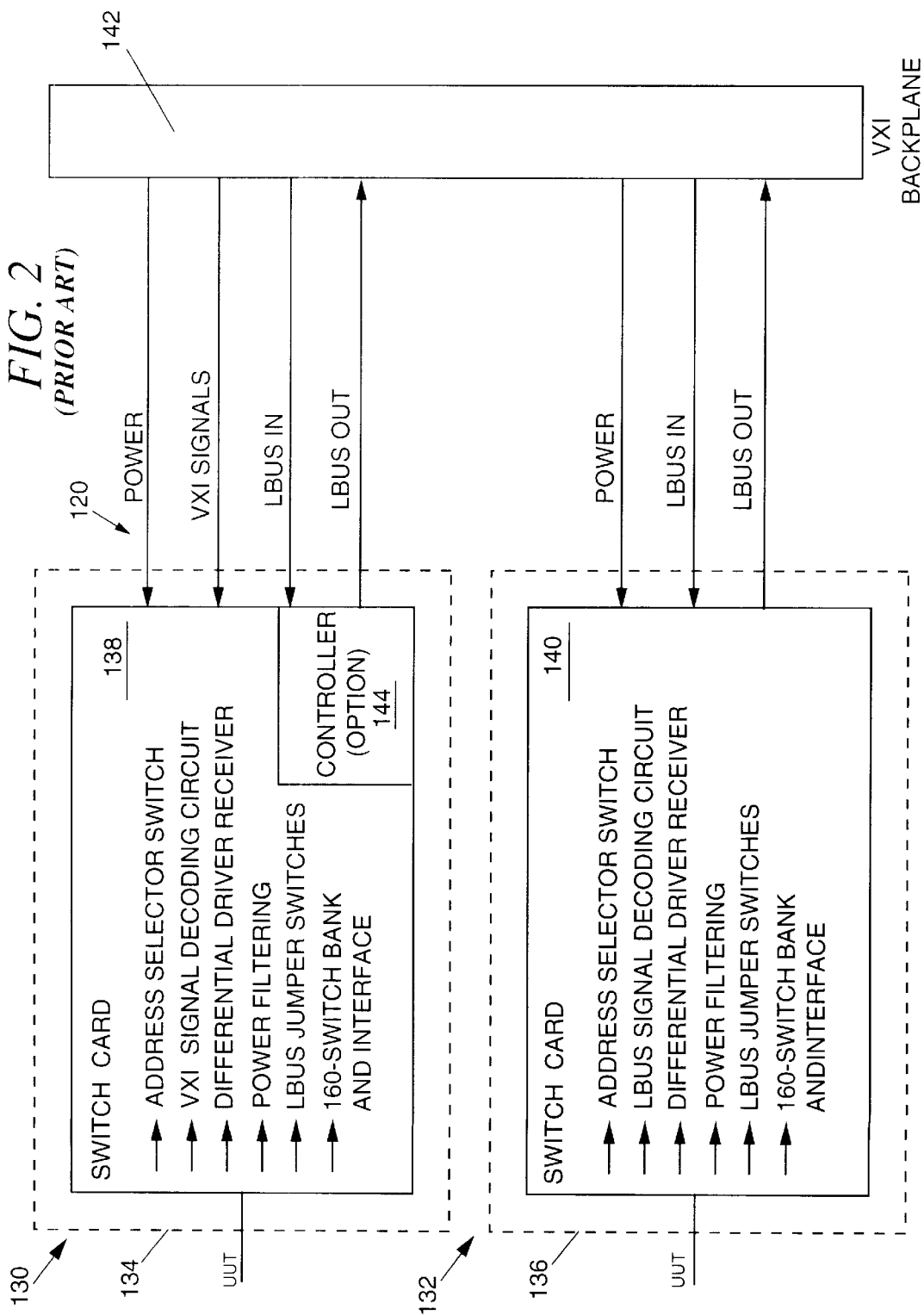
FIG. 2 illustrates a block diagram of a prior art VXI based system.
Figure 3:
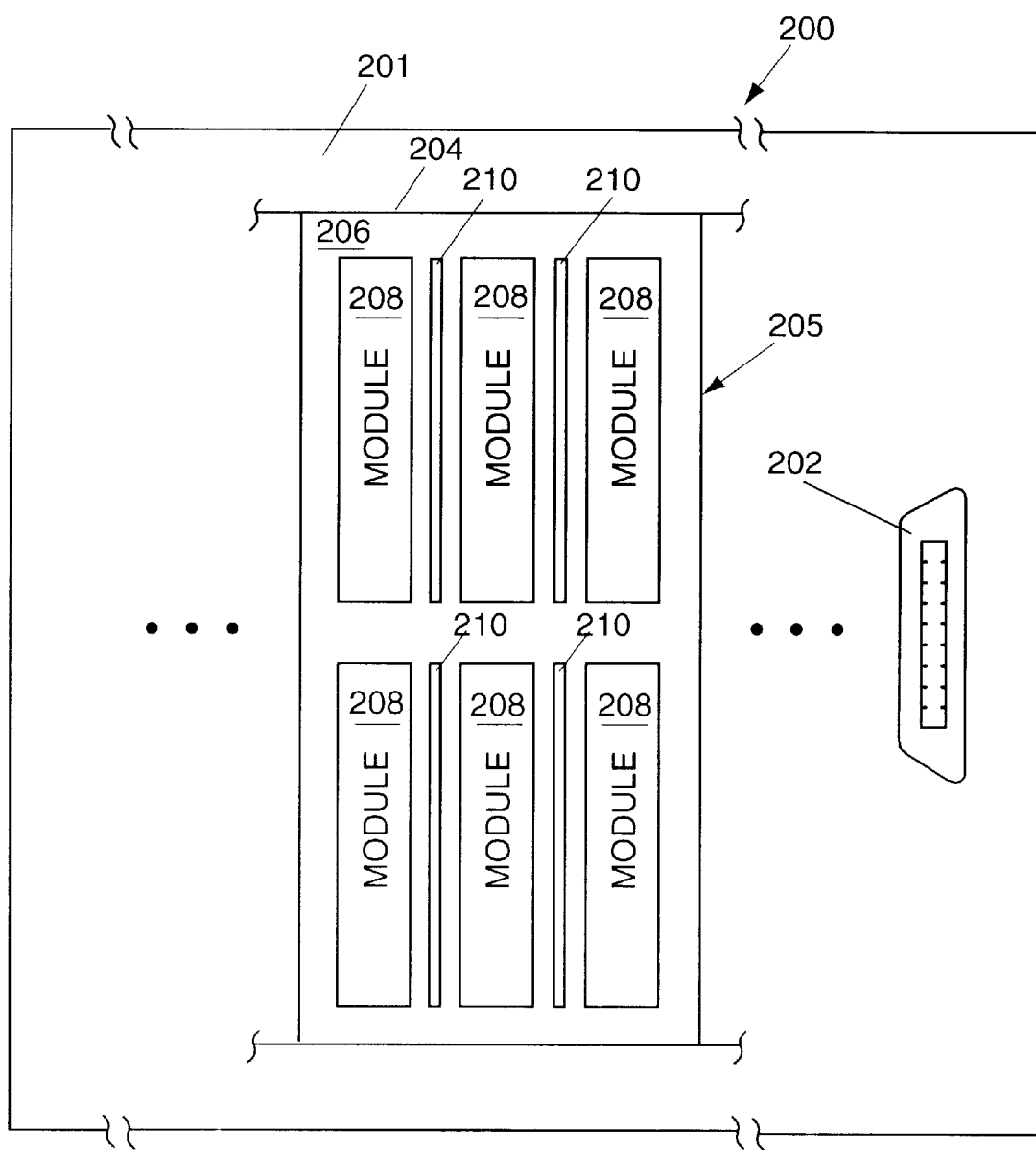
FIG. 3 illustrates a simplified representation of a front face view of a standard VXI chassis housing a VXI product plug-in in accordance with an aspect of the invention.

Referring initially to FIG. 3, a simplified representation is shown of a front face view of a new VXI based system 200 in accordance with an aspect of the invention. The VXI system 200 includes a standard VXI chassis 201 preferably having an adapter module 202 plugged into the left-most slot. The adapter 202 has a connector 203 for an external computer situated on its front face. The connector interfaces with a computer that can send and receive data by way of a VXI bus (not shown) to and from the VXI products incorporated into the chassis 201. Alternatively, an embedded computer can preferably be plugged into the left-most slot to eliminate the need for an external computer. The new VXI based system 200 differs from the prior art system 100 in that instead of one plug-in occupying a standard size slot, a simple plug-in in accordance with the invention occupies a slot equal to two-adjacent standard size slots, and is designated herein as slot 204.

A VXI product plug-in 205 comprises a carrier housing 206 that is sized and dimensioned to be received in slot 204. The carrier 206 preferably houses six (6) VXI module cards 208, whereby three (3) cards are positioned horizontally adjacent to each other at an upper section of the carrier, and the other three cards are positioned horizontally adjacent to each other at a lower section of the carrier. In this case, the carrier 206 houses modules that are situated adjacent to each other and relatively close. In the prior art VXI based system, adjacent modules 110 are separated by two carrier walls. Thus, there is substantial electromagnetic isolation between prior art modules 110. In order to provide electromagnetic isolation between adjacent modules 208 within carrier 206, thin sheets 210 of electrically conductive material are placed between adjacent modules and extend throughout the board length and width of the modules. The electrically-conductive thin sheets 210 are grounded by connection to a grounding plane located on an internal backplane (not shown), as will be explained in more detail later.

As FIG. 3 illustrates, for the same two standard slot widths, the new VXI based system 200 of the invention includes six (6) modules, whereas in the prior art system it only included two (2) modules. Since the modules of the new VXI package are less than half the height of the prior art ones, each includes only half the quantity of switches as provided in a prior art module. As previously discussed, for a two standard slot width, the prior art modules provided 320 switching relays. Whereas in the new VXI system 200, which includes modules with 80 switching relays each, a total of 480 switching relays can be housed in two standard slot widths. This is a substantial increase of 50 percent more capacity. The main reason for this increase is that in the new VXI based system 200, there is an absence of a wasted space between carriers within the standard two-slot width, since there is only one carrier situated within a two-slot area. Whereas, in the prior VXI system 100, there is a wasted area 112 between carriers 108.

Figure 4:
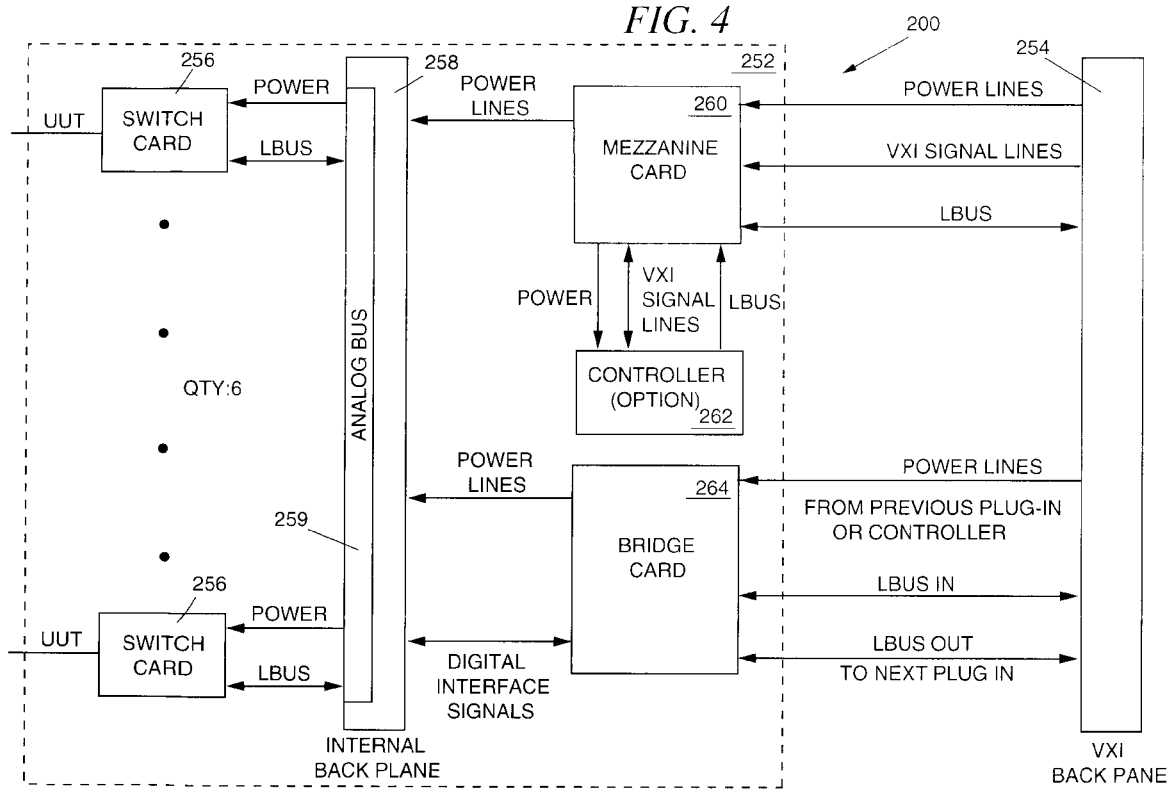
FIG. 4 illustrates a block diagram of the VXI and product plug-in in accordance with an aspect of the invention.

FIG. 4 illustrates a block diagram of a VXI product plug-in 250 configured to reside in the new VXI system 200 in accordance with another aspect of the invention. The VXI based system 200 comprises a VXI plug-in 250 comprising a carrier housing 252 that preferably houses the six (6) VXI modules and other circuitry. Instead of the module cards 256 connecting directly to the VXI backplane 254, such as in the prior art VXI based system 100, the switch cards 256 connect to an internal backplane 258, which includes an analog bus 259. The carrier 252 further houses a mezzanine card 260, a controller card 262 as an option, and a bridge card 264.

The Mezzanine card 260 includes connectors for coupling to the power, VXI signal and LBUS lines of the VXI backplane bus 254. In addition the Mezzanine card 260 is coupled to the internal bus 258 via power lines. The Mezzanine card 260 is also coupled to the controller card 262, if a controller card is present, by way of VXI bus signal lines, power lines, and LBUS lines. In the preferred embodiment, the controller card 262 is piggy backed on the Mezzanine card 260 and includes direct connections to the VXI signal lines and LBUS lines. Furthermore, it is only necessary that one of the VXI plug-ins 250 of the VXI based system includes a controller 262. The controller 252 provides addressing and operating commands to the six modules 256 and other modules (not shown) by way of the local bus (LBUS). The bridge card 264 is coupled to the VXI backplane bus 254 by way of power lines and LBUS lines, and coupled to the internal backplane 258 by way of power and digital interface signal lines.

In operation, the Mezzanine card 260 and bridge card 266 include power filtering circuits for the VXI power lines coming from the VXI backplane bus 254, and directs the filtered power to the switching cards by way of the internal backplane bus 258. The controller board 262 receives VXI signals from the VXI backplane bus 254 and decodes or interprets them to generate address and data information for potentially all the plug-ins sharing the VXI backplane bus. This address and data information is sent to each of the plug-ins by way of the local bus, LBUS. As was previously discussed, the plug-ins can be cascaded or daisy chained through the plurality of discrete segments of the local bus LBUS. The bridge board 264 receives the addressing and operating instructions from the controller card 262 by way of the LBUS to generate local address and data information for the six (6) module cards in data communication with the bridge board through the internal backplane 258.

Figure 5:
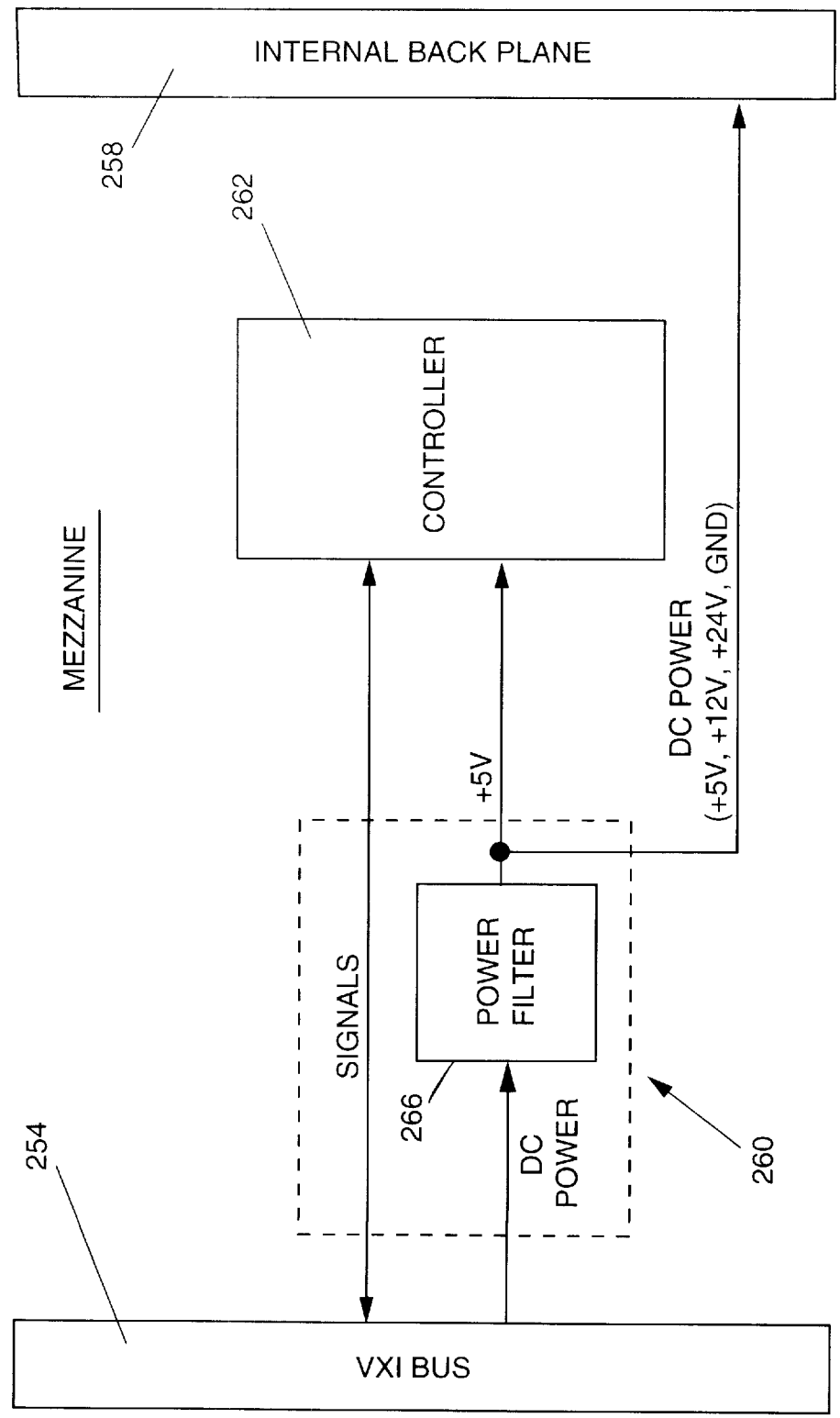
FIG. 5 illustrates a block diagram of a Mezzanine submodule in accordance with an aspect of the invention.

FIG. 5 illustrates a block diagram of the Mezzanine card 260 in operating relationship with the controller 262, the VXI bus 254, and the internal bus 258. The Mezzanine card 260 preferably comprises a power filter circuit 266 coupled to the VXI bus 254 for filtering the direct current (dc) power received from the VXI bus, and providing a filtered dc voltage of +5 Volts, +24 Volts, and ground (Gnd) to the controller 262, and filtered voltages of +5 Volts, +12 Volts, +24 Volts, and ground (Grnd) to the internal backplane 258 for use by the switch cards.

Figure 6:
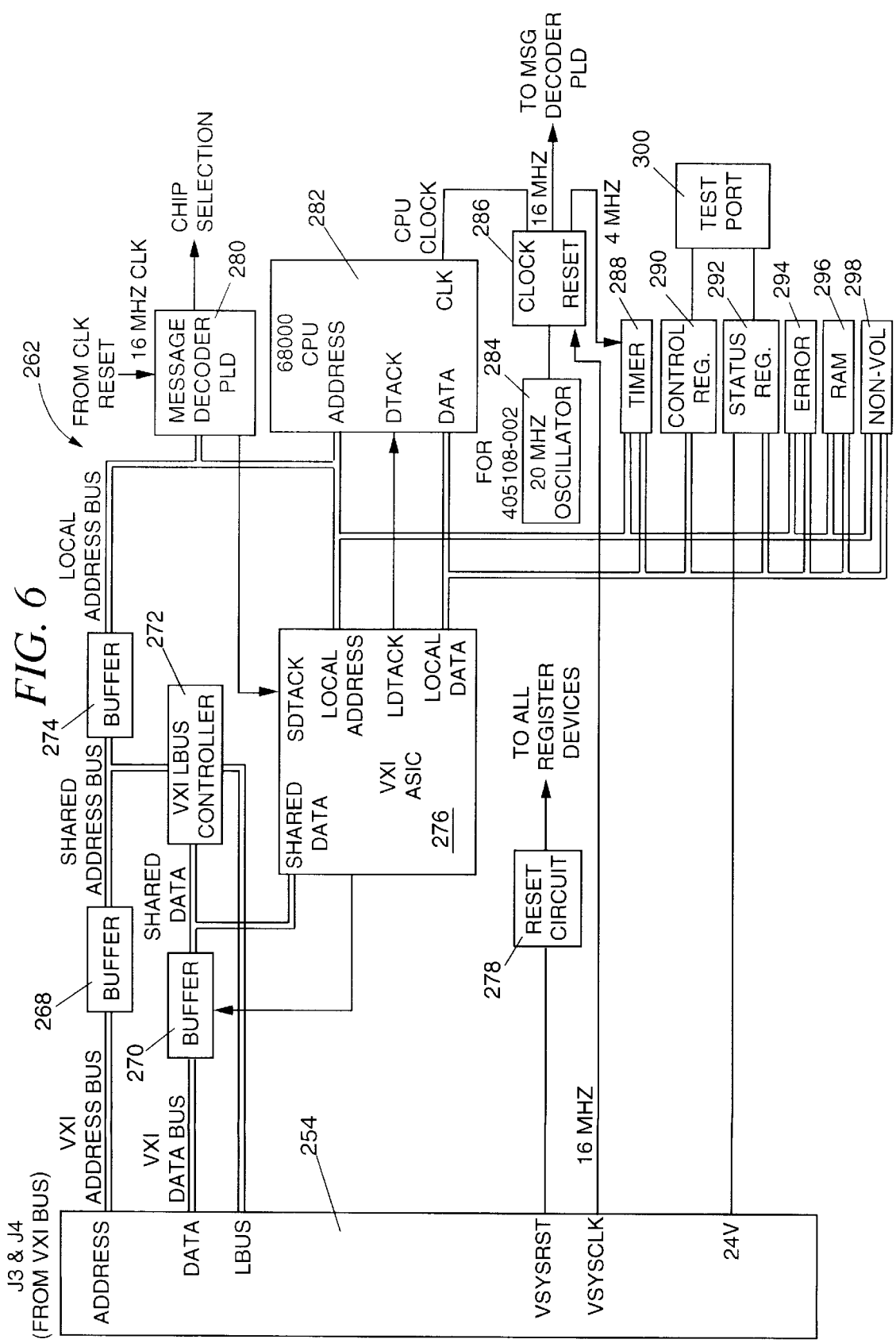
FIG. 6 illustrates a block diagram of a controller submodule in accordance with an aspect of the invention.

FIG. 6 illustrates a block diagram of the controller board 262 in operating relationship with the VXI backplane bus 254 in accordance with the invention. The controller card 262 comprises buffers 268 and 270 coupled to the VXI bus by way of the VXI address bus and the VXI data bus. The output of the buffer 270 is coupled to the VXI LBUS controller and the VXI application specific integrated circuit (ASIC) 276 along the shared data lines. The buffer 268 is coupled to the VXI LBUS controller 272 and an additional buffer 274 along a shared address bus. The buffer 274 is, in turn, coupled to the message decoder PLD 280, to the local address port of the VXI ASIC 276, to the address port of the 68000 central processing unit (CPU) 282, to a timer 288, to a control register 290, to a status register 292, to an EPROM 294, to a RAM 296, and to a non-volatile memory 298, all along the local address bus. The local data port of the VXI ASIC 276 and the 68000 CPU are coupled together, along with the timer 288, the control register, the status register 292, the EPROM 294, the RAM 296 and the non-volatile memory 298. The inputs of the control register and outputs of the status registers 290 and 292 are coupled to a test port 300. The message decoder PLD 280 is coupled to the SDTACK port of the ASIC 276, and the LDTACK port of the VXI ASIC is coupled the DTACK port of the 68000 CPU.

The controller card 262 further includes a 20 MHz oscillator 284 coupled to a clock select 286. The clock select 286, in turn, is coupled to the VXI bus 254 for receiving therefrom the 16 MHz system clock. The clock select 286 includes an output coupled to the clock port of the CPU 282 for supplying it the CPU clock, another output coupled to the message decoder PLD 280 for supplying it a 16 MHz clock, and an additional output to the timer 288 for supplying it a four (4) MHz clock. The controller card 262 further includes a reset circuit 278 coupled to the VXI bus 254 for receiving the system reset for resetting all register devices on the controller when the system reset is set. In addition, the status register 292 is coupled to the 24-Volt power line of the VXI bus 254.

In operation, the controller 262 operates either in a message-based access mode or in a register-based access mode. In the message-based mode, the CPU 282 waits for a command from the computer via the VXI bus. When a command arrives, the CPU 282 parses the elements of the command to determine which switch module should be accessed, and which relay register should be read from or written to. The CPU then accesses the appropriate relay register on the appropriate switch module to carry out the task required by the command. In the register-based mode, the external or embedded computer (not shown) can access a switch plug-in directly without sending a command to the CPU 282. It does this via the shared address bus connected to the VXI LBUS controller 272. The VXI LBUS controller 272 receives address and data information from the external or embedded computer, and generates the required VXI LBUS signals to communicate the information to the switch plug-ins (not shown). This method of accessing the switch modules is approximately 1000 times faster than access by the message-based method, since the CPU 282 does not have to parse commands, or be involved in any other way, when the register-based access is performed.

Figure 7:
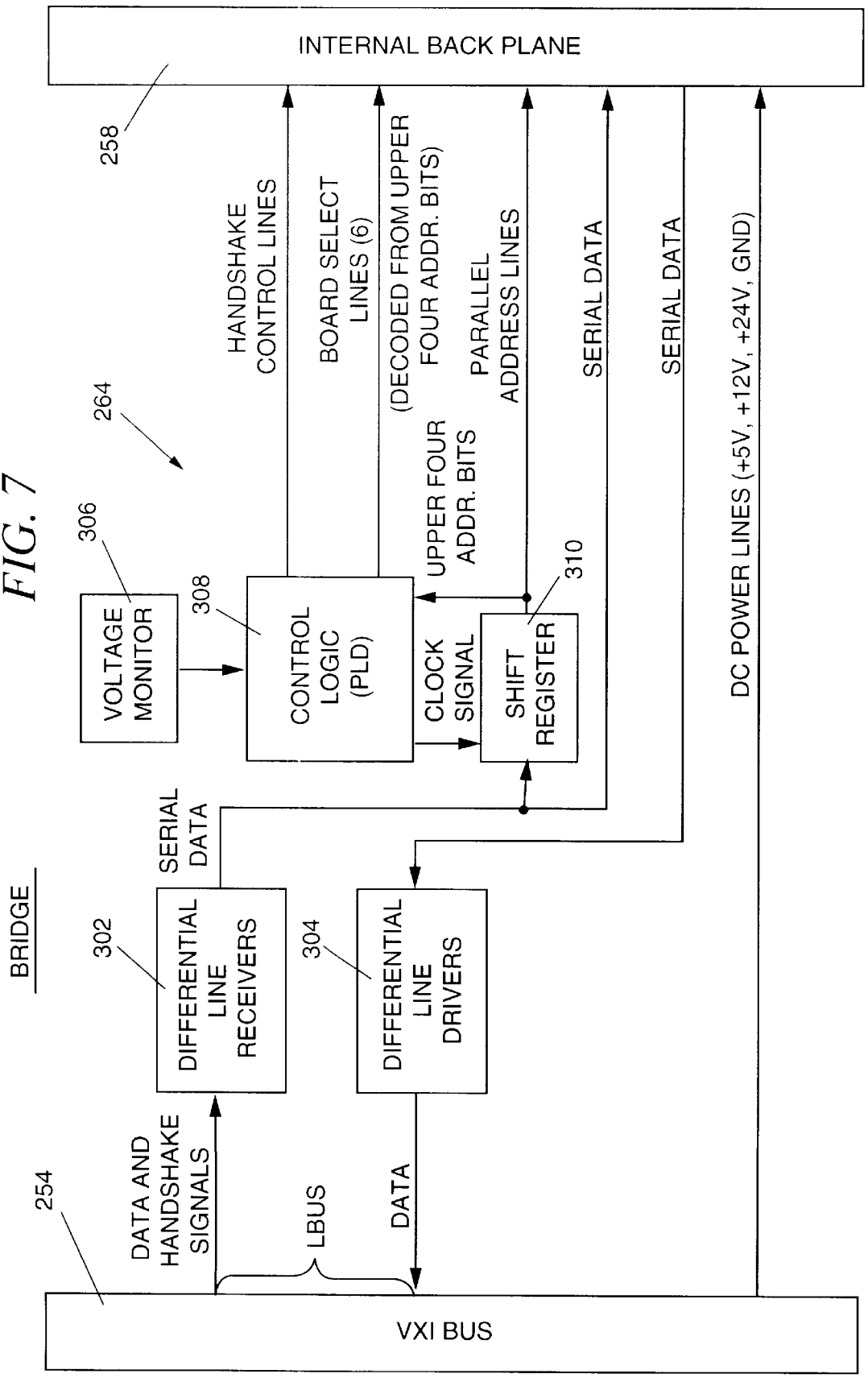
FIG. 7 illustrates a block diagram of a bridge submodule in accordance with an aspect of the invention.

FIG. 7 illustrates a block diagram of the bridge card 264 in operating relationship with the VXI bus 254 and the internal backplane bus 258 in accordance with the invention. The bridge card 260 preferably comprises a pair of differential line receivers 302 and 304, one for receiving incoming data and handshake signals from the VXI bus 254 and the other for transmitting outgoing data to the VXI bus 254. The differential line receiver 302 is coupled to a shift register 310 for converting the serial data produced at the output of the differential line driver to parallel data. The differential line driver 302 is coupled to the internal backplane 258 for providing the serial data to the switch modules. The parallel address output of the shift register 310 is coupled to the backplane interface for providing the address lines to the switch modules. In addition, the output of the shift register 310 is coupled to the control logic (PLD) 308 to preferably provide it with the upper four bits of the parallel address. The control logic (PLD) 308 is coupled to the internal backplane by way of handshake control lines and board select lines (preferably six (6) lines, one for each switching module in the plug-in). The internal backplane 258 is coupled to the differential line driver 304 for providing thereto serial data derived from the switch modules. In addition, the bridge board 264 provides a direct path for the dc power lines (+5V, +12V, +24V, Gnd) from the VXI bus 254 to the internal bus 258. In addition, the bridge board 264 includes a voltage monitor 306 coupled to the control logic (PLD) 308.

Figure 8A:
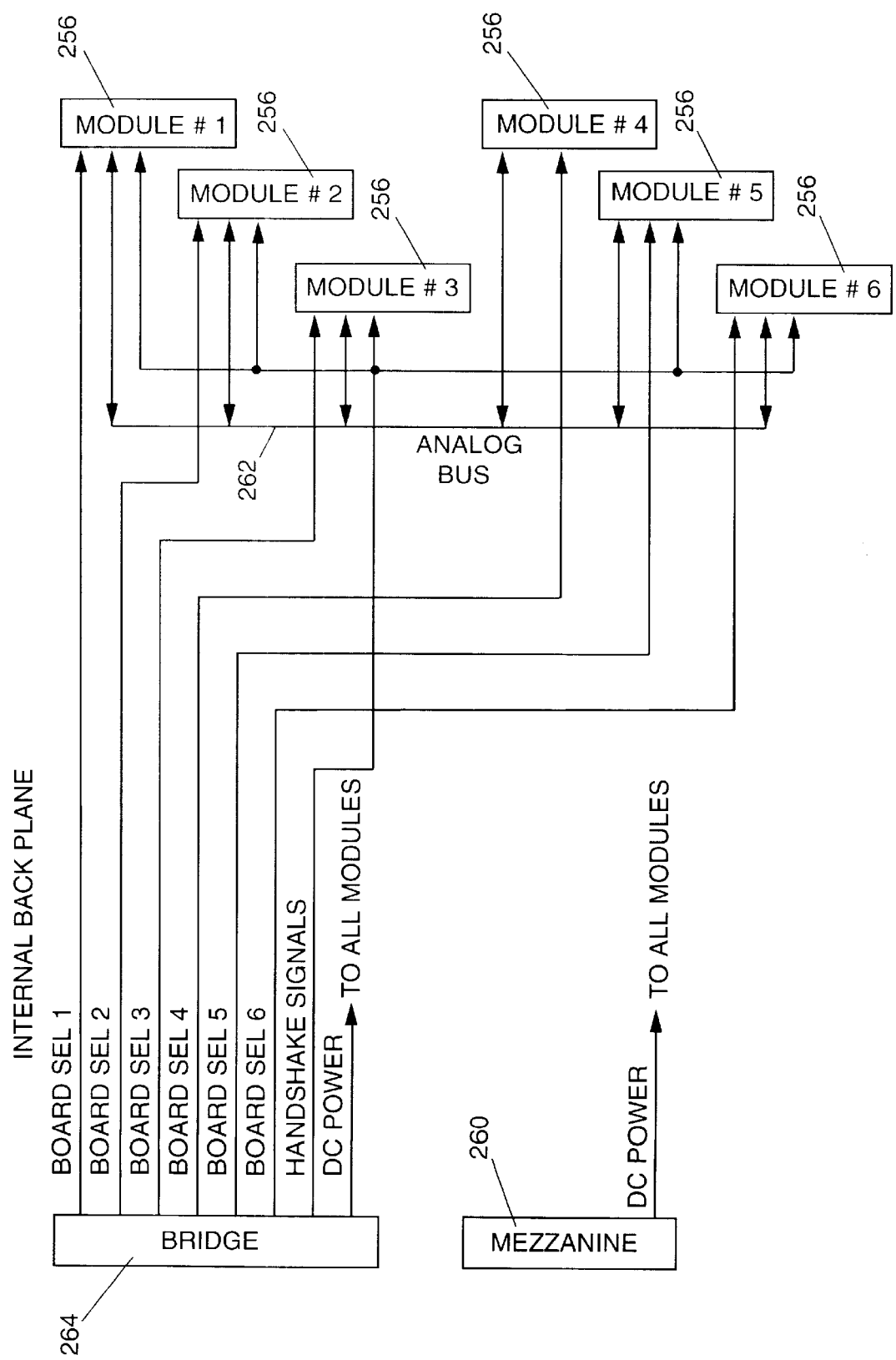
FIG. 8a illustrates a block diagram of an internal backplane in accordance with an aspect of the invention.

FIG. 8A illustrates a block diagram of the internal backplane 258 in operating relationship with the bridge board 264, the mezzanine board 260, and the switch card modules 256 of the plug-in 250. The internal backplane 258 provides the board select lines (1–6) from the bridge board 264 to the corresponding modules 256. In addition, the internal backplane 258 provides the handshake signal lines and the dc power lines from the bridge board 264 to each of the modules 256. The internal backplane 258 also provides the dc power lines from the mezzanine board 260 to each of the modules 256. In addition, the internal backplane 258 also includes an analog bus 262 coupled to each of the modules 256, which is explained in more detail below.

Figure 8B:
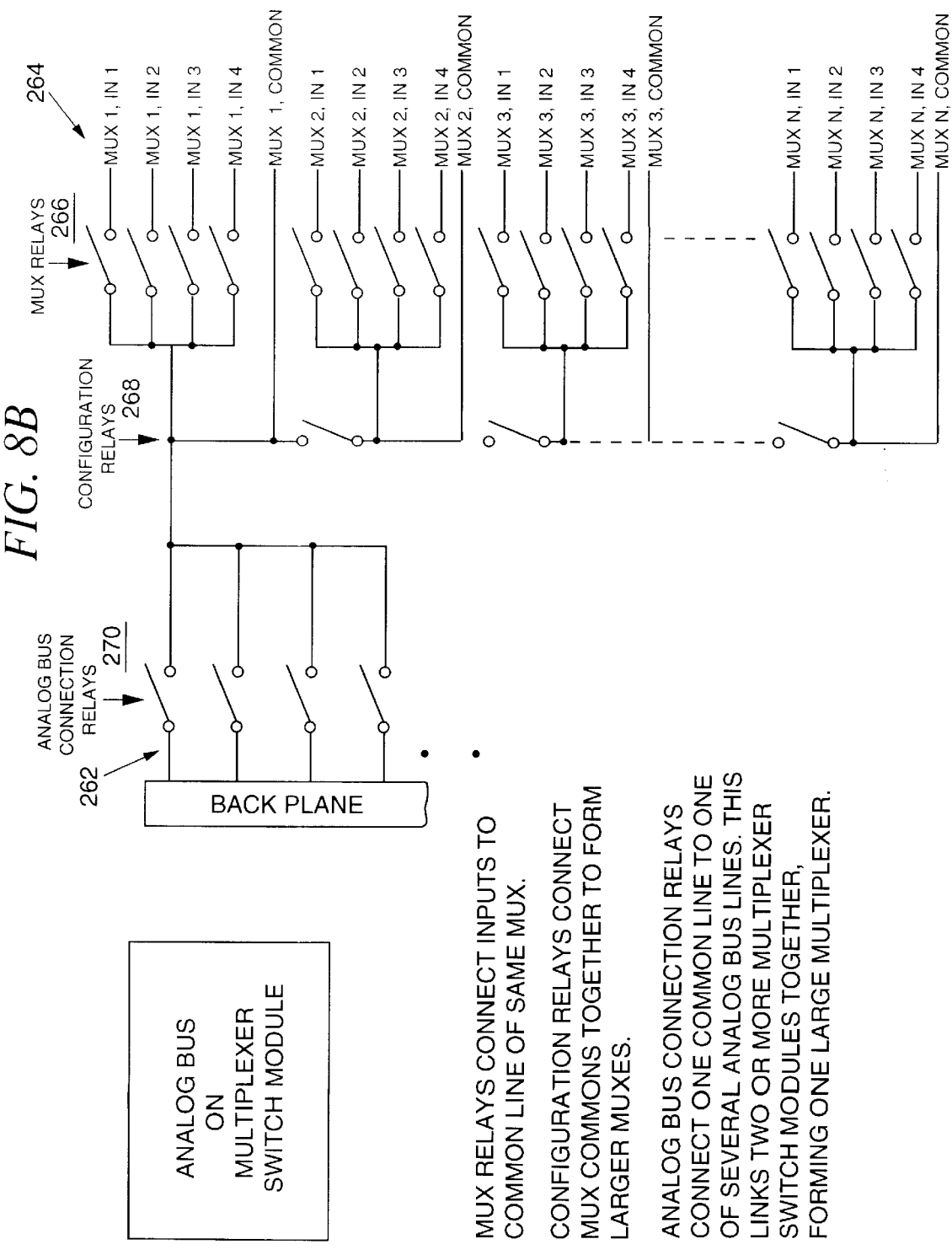
FIG. 8b illustrates a block diagram of a multiplexer switch module in accordance with the invention.

FIG. 8B illustrates a schematic and block representation of an analog bus 262 coupled to a switch module that is configured into a multiplexer, and designated herein as reference number 264. The multiplexer switch module 264 comprises a plurality of separate multiplexers Mux 1–N, which are in this example (1×4) types. The multiplexer switch card 264 further includes a set of Mux relays 266 for each of the multiplexers 1–N, for selectively coupling one of the four inputs of the multiplexers to their corresponding common line. The multiplexer switch module 264 also includes a plurality of configuration relays 268 coupled respectively to each of the common lines of the multiplexers 1–N for selectively forming larger multiplexers. The multiplexer switch module 264, in addition, includes analog bus connection relays 270 for selectively coupling the resulting common line of the multiplexers 1–N that are configured together into a plurality of analog bus lines, preferably two-wire differential signal lines, to form even larger multiplexers with other multiplexer module cards sharing the analog bus. With the use of the analog bus, switch modules can be selectively coupled to each other in numerous combinations.

Figure 9:
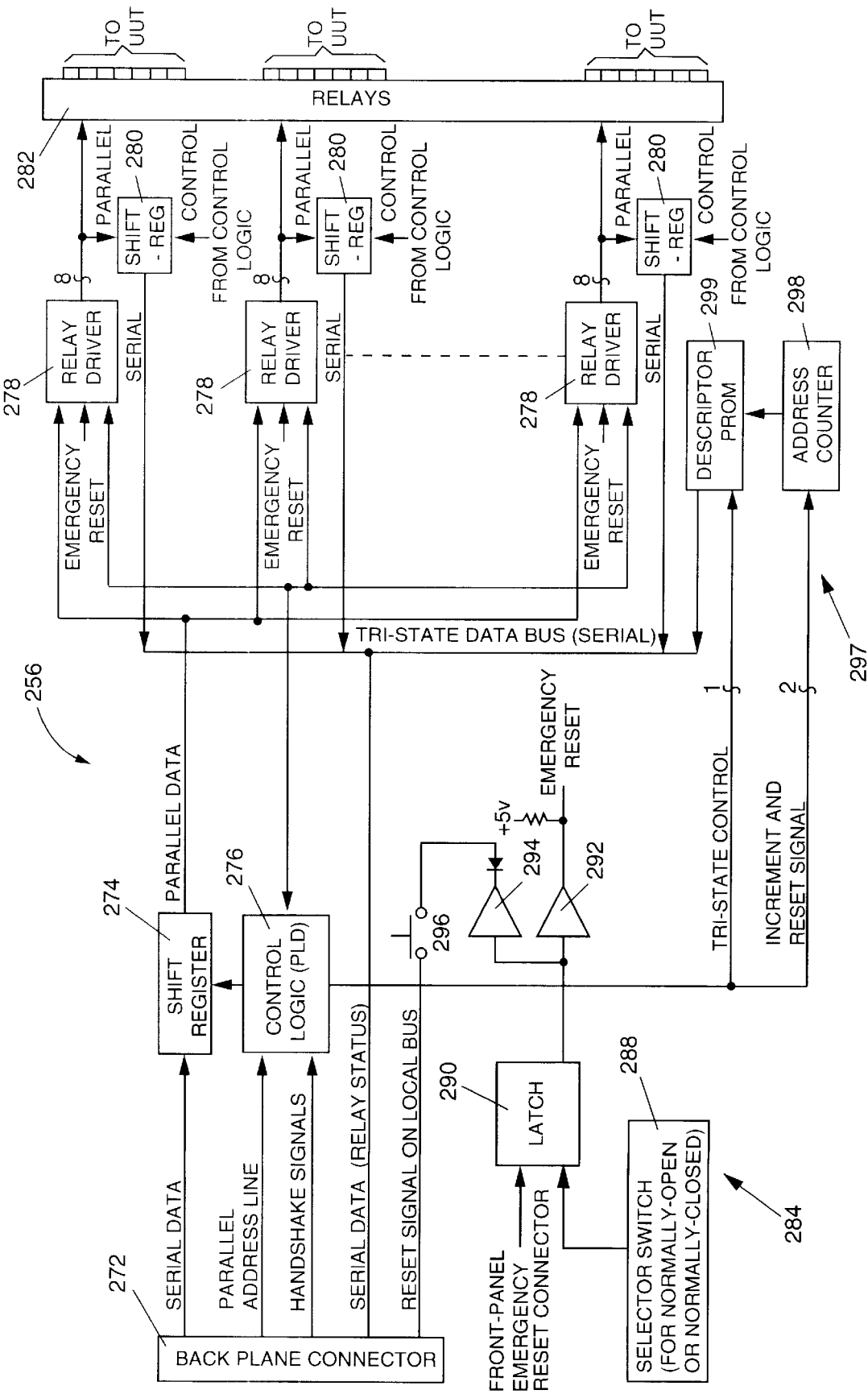
FIG. 9 illustrates a block diagram of a switching module in accordance with an aspect of the invention.

FIG. 9 illustrates a block diagram of the switch module 256 in accordance with the invention. The switch module 256 comprises a backplane connector 272 for interfacing with the internal backplane of the plug-in. A module 256 includes a shift register 274 controlled by a control logic (PLD) 276 for converting the serial data received from the bridge board 264 by way of the internal backplane 258. The control logic (PLD) 276 receives parallel address and handshake information from the bridge board by way of the internal backplane 272. The output of the shift register 274 is coupled to each of the relay drivers 278 for providing the parallel data to the drivers. In addition, the control logic (PLD) 276 is also coupled to each of the relay drivers 278. The outputs of the relay drivers 278 are coupled to the bank of relay switches 282 for driving the selected switch or switches in accordance with the data and address information provided to the module. The outputs of the relay drivers 278, which preferably is an 8-bit bus, are coupled to corresponding shift registers 280 for sending relay status information back to the controller 262 along a tri-state serial data bus which couples back to the local bus LBUS of the VXI backplane bus.

A unique feature of the switch module 256 is the inclusion of an emergency reset circuit 284 for causing all the relay switches of the switch module to open by the operation of an external switch connected to the front panel of the switch module. One advantage of this feature is that if a hazardous condition is spotted by the user that involves a particular module, the user can simply disable the operation of the module by pushing the emergency reset button, without affecting the operation of the other modules of the VXI system.

The emergency reset circuit 284 comprises a latch 290 coupled to the emergency reset connector located on the front-panel of the plug-in. The latch 290 is also coupled to a selector switch to accommodate either a normally-open or normally-closed external switch. The output of the latch 290 is coupled to a pair of buffers 292 and 294. The output of buffer 292 is coupled to an emergency reset input of each of the relay drivers 278. Upon operation of the emergency reset switch, the output of the latch 290 by way of the buffer 292 will cause a local reset or opening of all the switches in the module. The output of the other buffer 296 is coupled to the reset signal on the local bus (LBUS) by way of a jumper 296. If the jumper 296 is installed, the emergency reset circuit 282 will trigger open all the switches of every switch module coupled to the reset signal on the local bus LBUS when the external reset switch is operated.

Another unique feature included in the switch module 256 is an automatic identification circuit 297 which provides the controller card with descriptor information and a program routine so that the controller has the necessary information to operate the switch module. The advantage of this is that new VXI product plug-ins or modules can be incorporated into a VXI based system without the need for manually updating the controller card to instruct it on how to address and operate the new plug-ins or modules. The circuit 297 comprises an address counter 298 coupled to a programmable read only memory 299 for storing a descriptor, describing the switch architecture, and a program routine which can be uploaded to the RAM of the controller card for execution by the CPU when the new module is to be addressed and operated. The control logic (PLD) 276 is coupled to the address counter 298 for providing it increment and reset signals, and coupled to the PROM 299 for providing it tri-state control signals. The data output of the PROM 299 is coupled to the Tri-state serial data bus for transmitting the program routine to the controller card by way of the local bus (LBUS).

Figure 10:
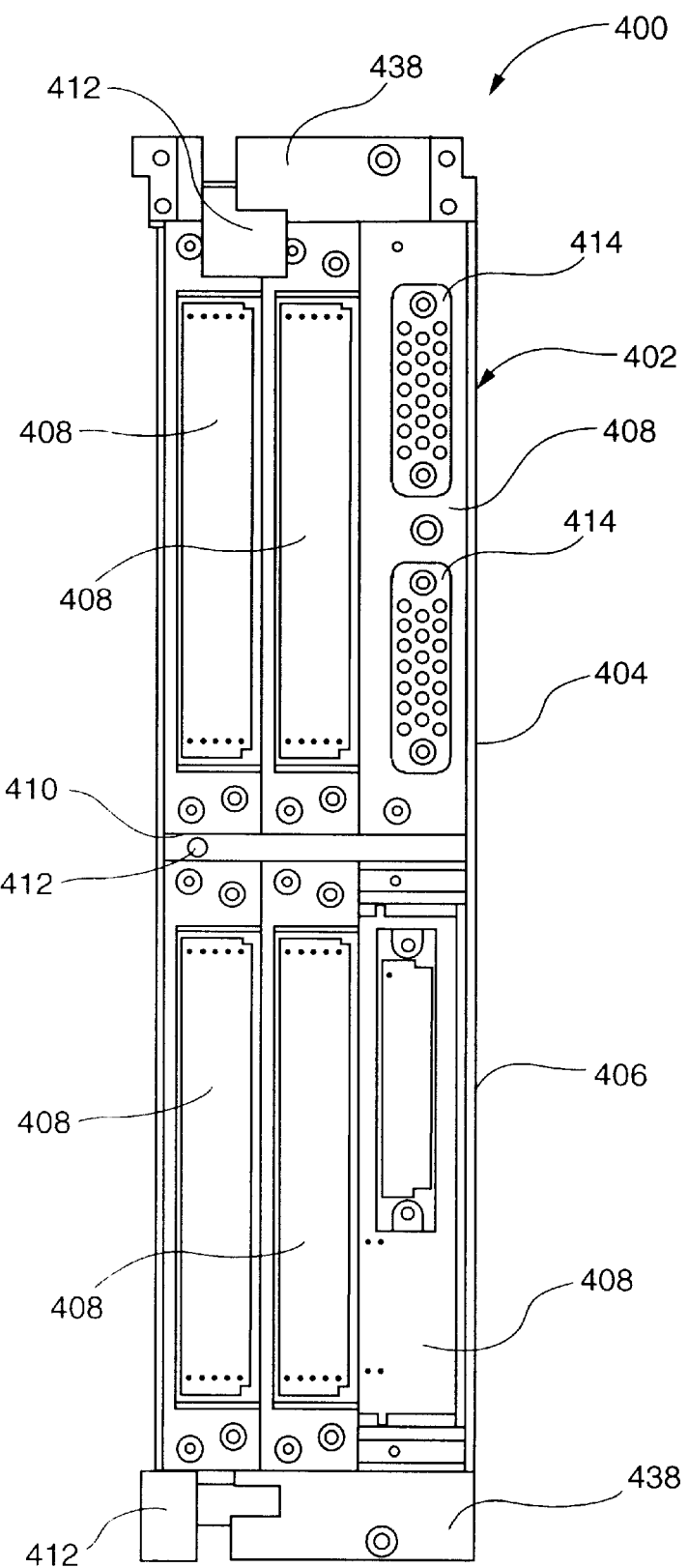
FIG. 10 illustrates a front view of a VXI product plug-in in accordance with an aspect of the invention.

FIG. 10 illustrates a front view of a more realistic diagram of the preferred VXI plug-in 400 in accordance with an aspect of the invention. The plug-in 400 comprises a carrier housing 402 divided horizontally into an upper compartment 404 and a lower compartment 406. The upper compartment 404 of the carrier housing 402 is sized and configured to receive therein three module cards 408 positioned horizontally adjacent to each other. The lower section 406 of the carrier housing 402 is sized and configured to receive therein three module cards 408 positioned horizontally adjacent to each other. The module cards 408 are securely attached to the carrier housing 402 by way of a plurality of screws. A fail light indicator 410, which is commonly employed in VXI modules, is situated within a space between the upper and the lower sections for indicating whether the controller card has failed its power-on self-test. A pair of injector/ejector handles 412 are preferably positioned near the top and bottom of the carrier 400. They facilitate the secured insertion and removal of the plug-in from the chassis and backplane connection, as will be explained in more detail later. One or more of the module cards 408 can include connectors 414 for interfacing with a unit-under-test (UUT) or other devices.

Figure 11:
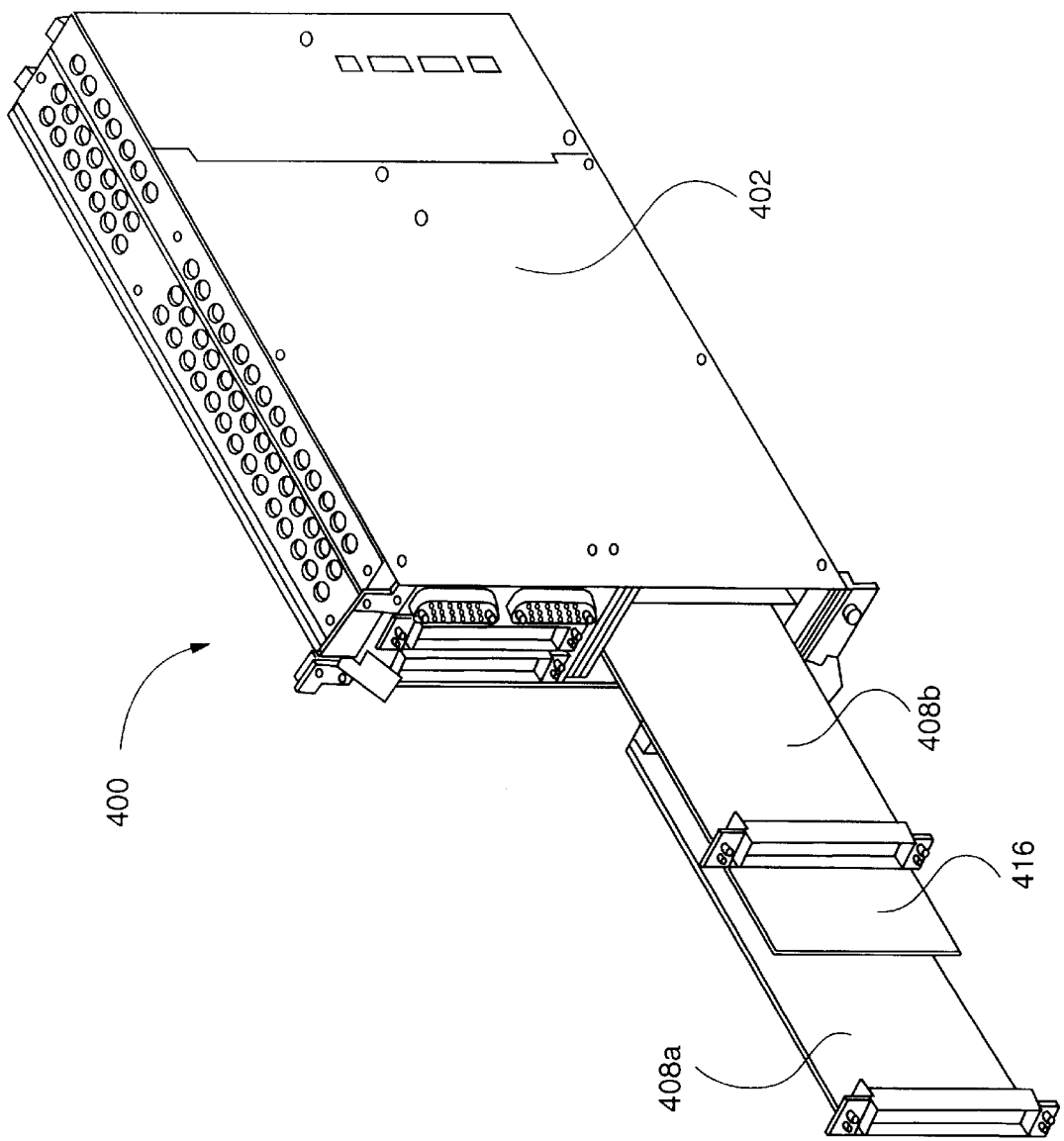
FIG. 11 illustrates a front perceptive of the VXI plug-in of FIG. 10.

FIG. 11 illustrates a front perspective view of the VXI plug-in 400 shown in FIG. 10, with one module card 408a totally removed from the carrier housing 402 but in registered position with the corresponding carrier slot, and another module card 408b partially removed from the corresponding carrier slot. A thin sheet 416 of conductive material is positioned between the module cards 408a and 408b for electromagnetically isolating the cards. Preferably the thin conductive sheet 416 extends substantially the full width and length of the module boards so that optimum isolation is provided. The thin sheet 416 is preferably grounded to a grounding plane on the internal backplane bus (not shown in FIG. 11). All module cards 408 are preferably separated from respective adjacent cards by such a thin conductive sheet 416.

Figure 12:
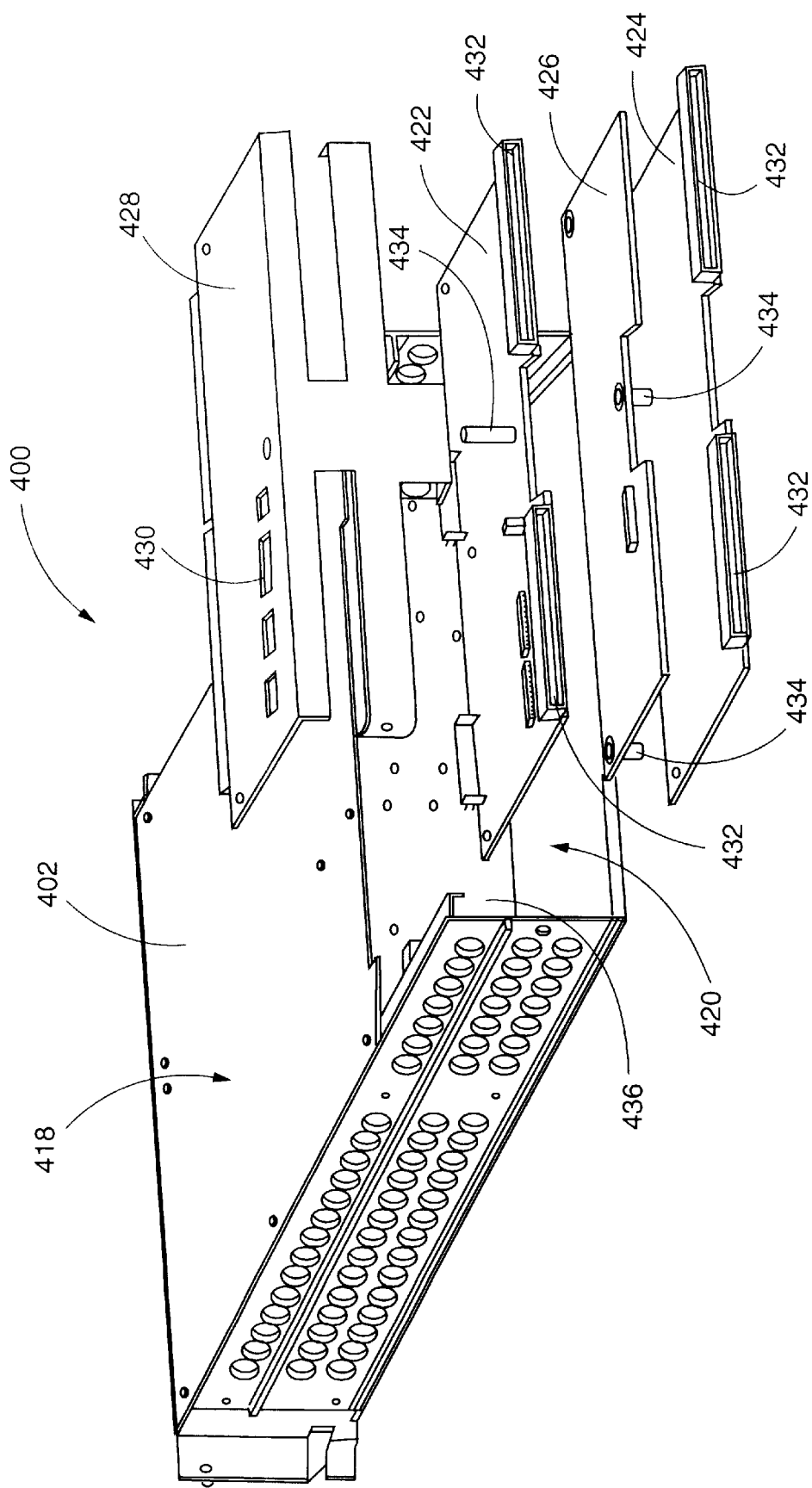
FIG. 12 illustrates a rear perspective view of the VXI plug-in of FIG. 10.

FIG. 12 illustrates a rear perspective view of the VXI plug-in 400 with a plurality of the VXI bus interfacing boards removed rearward from the carrier housing 402, but in same orientation as if they were properly positioned in the carrier. As illustrated in FIG. 12, the carrier housing 402 comprises a front compartment 418 (not shown but indicated by the dashed reference line to be internal to the carrier) for enclosing the module cards 408 and the electrically conductive sheets 416. The carrier housing 402 includes a rear compartment 420 for housing a bridge module card 422, a mezzanine module card 424, and optionally a controller card 426. The carrier 402 includes a cover 428 for the rear compartment 420 which can be removed to allow access to the rear compartment. The cover includes a plurality of windows 430 to allow access to the dip switches present on the bridge module card 422.

The mezzanine and bridge cards 422 and 424 each include a pair of connectors 432 for mating with corresponding connectors on the VXI backplane. The controller board, when present, is stacked on top of the mezzanine board, and spaced apart from each other by one or more stand-offs 434. When the controller board 426 is provided and is vertically stacked on top of the mezzanine board 424, a plurality of pins on the controller board are in registered position with a plurality of holes on the mezzanine board 424 to provide a registered connection of the connector pins 432 to the pins of the controller board. Thus, the controller board 426 is directly connected to the VXI backplane when the plug-in is fully inserted into the VXI chassis. In the preferred embodiment, the board layout or traces of the mezzanine board 424 and the bridge board 422 are the same, but are populated with different components. This has the advantage of providing one board type for both applications.

The VXI plug-in 400 includes an internal backplane board 436 positioned within the carrier housing 402 in a manner that it forms a wall that divides the front compartment 418 from the rear compartment 420 of the carrier housing. The front side of the backplane board 436 preferably includes six (6) connectors (not shown) for mating with corresponding connectors of the six module cards 408. The rear side of the backplane board includes connectors for mating with connectors on the mezzanine and bridge boards.

Figure 13:
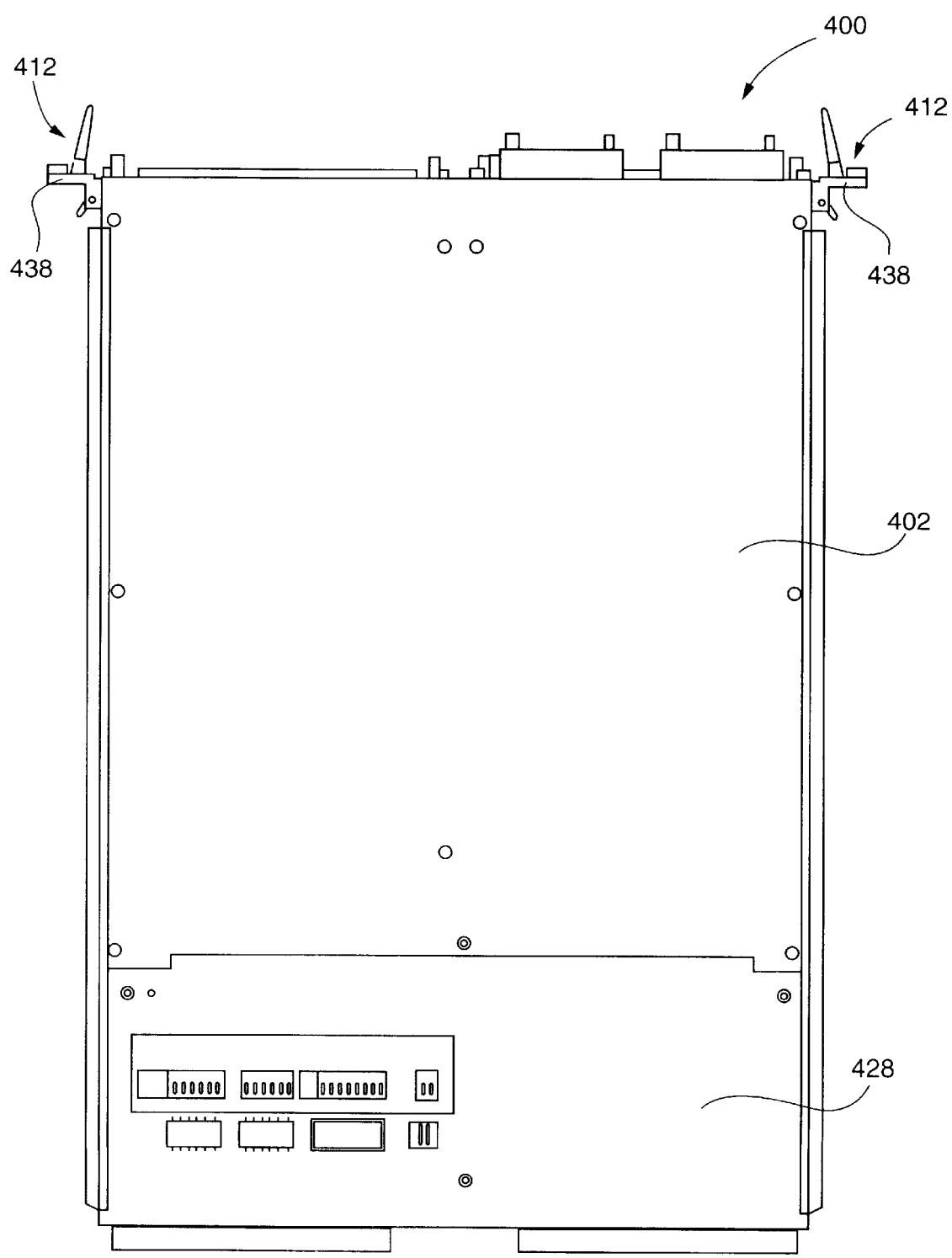
FIG. 13 illustrates a side elevation view of the plug-in of FIG. 10.

FIG. 13 illustrates a side elevation view of the VXI plug-in 400. As previously mentioned, the plug-in 400 includes a pair of injecting and ejecting mechanisms 412. These mechanisms 412 facilitate the secured insertion and removal of the plug-in from the VXI chassis and backplane connection. The mechanism 412 is rotatably or pivotably mounted to respective L-shaped brackets 438 situated on the top and bottom of the carrier housing as seen in FIG. 10.

Figure 14:
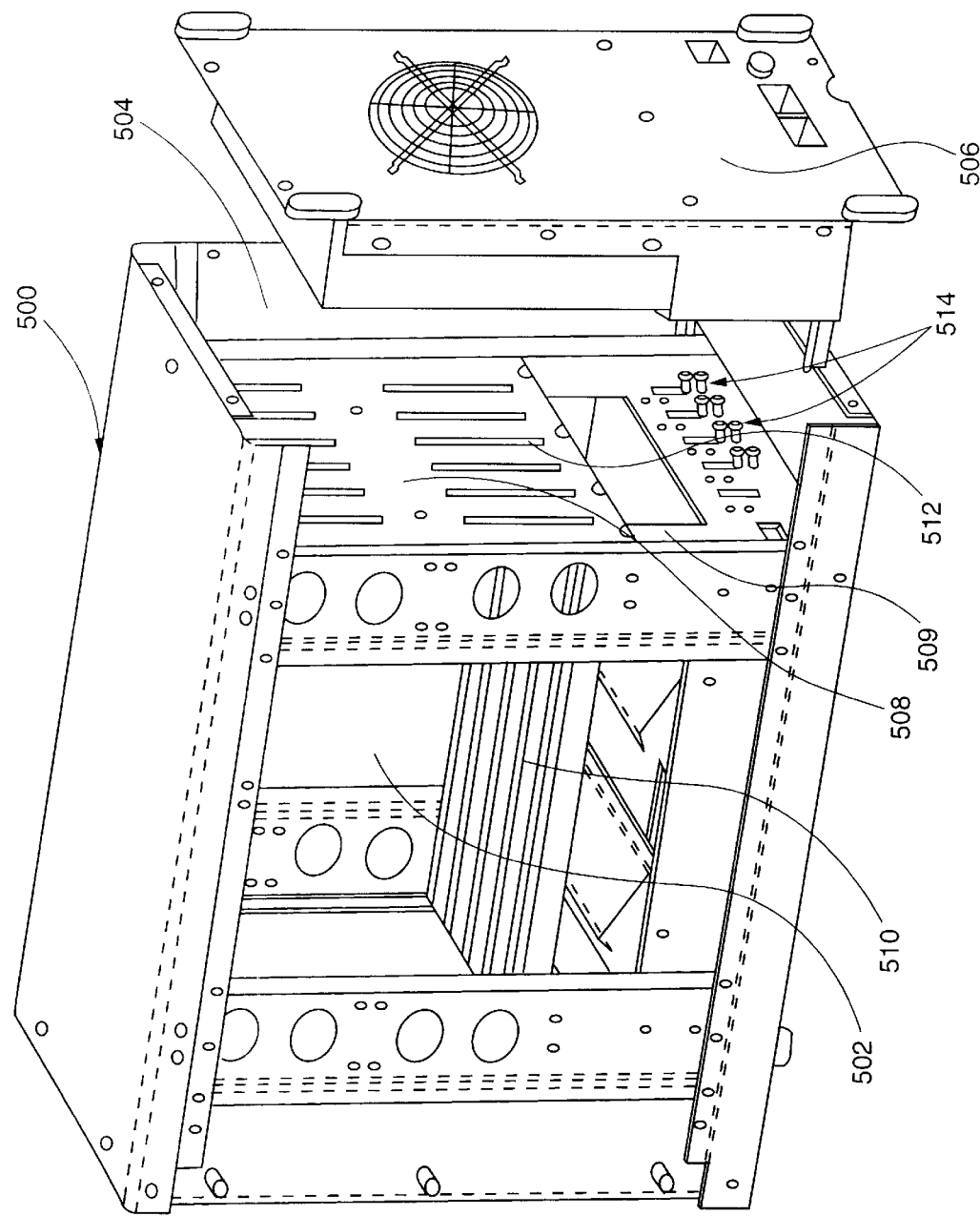
FIG. 14 illustrates a rear perspective view of a VXI chassis configured in accordance with an aspect of the invention.

FIG. 14 illustrates a rear perspective view of a standard VXI chassis or mainframe 500 configured in accordance with an aspect of the invention. The VXI mainframe 500 comprises a front compartment 502 for housing the VXI product modules, and a rear compartment 504 for housing a power supply unit 506. The VXI mainframe 500 includes a VXI backplane 508 mounted to a chassis dividing wall 509 that separates the front compartment 502 from the rear compartment 504. The mainframe 500 includes a plurality of slot rails 510 situated in the front compartment 502 for guiding the VXI plug-ins as they are inserted into the chassis. The VXI backplane 508 includes a plurality of connectors (not shown) on the front side of the backplane 504 that are coincident with the connector hole patterns 512 shown on the back of the VXI backplane 508. At the lower end of dividing wall 509 are mounted a plurality of connectors 514 that mate with corresponding connectors on the power supply unit 506. This feature allows the power supply unit to be connected directly to the VXI backplane, without the need for wire harnesses or the like.

Figure 15:
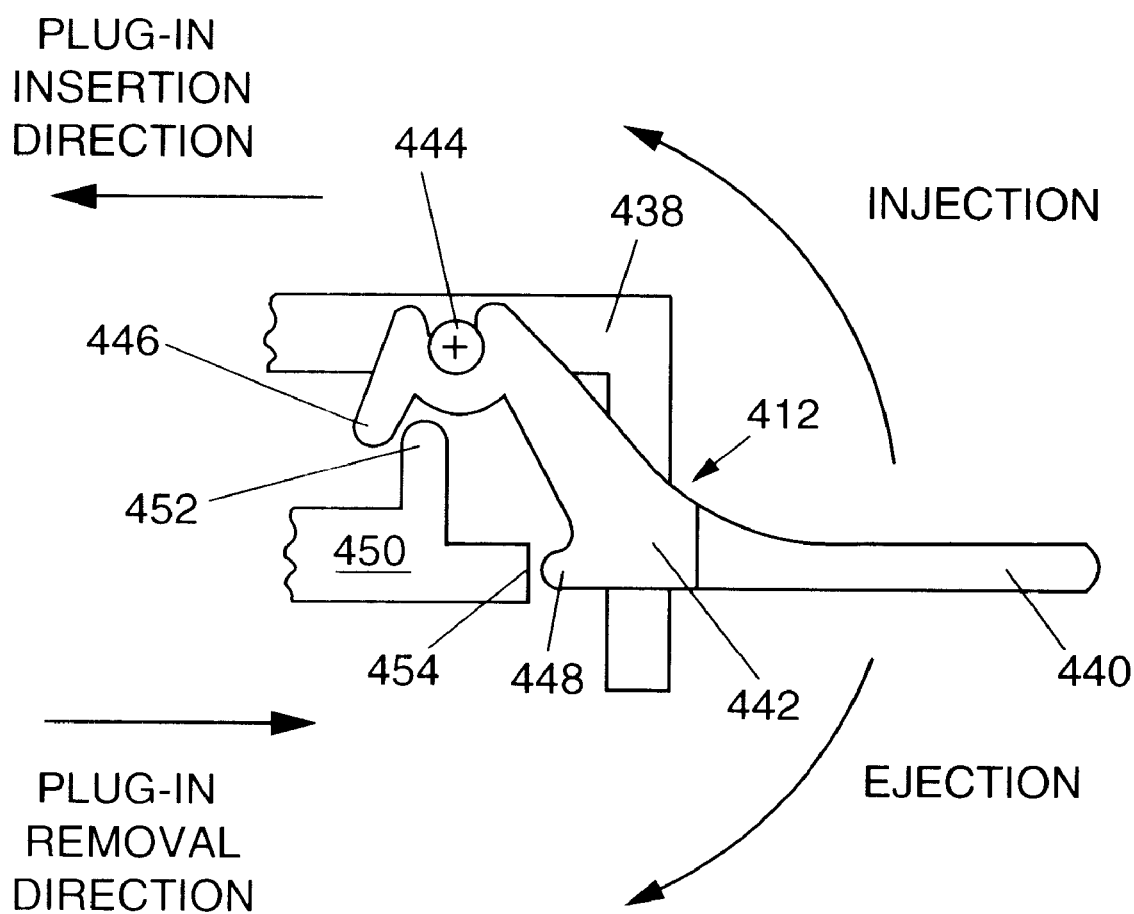
FIG. 15 illustrates a side view of an injection and ejection mechanism in accordance with an aspect of the invention.

FIG. 15 illustrates a side view of one of the injection and ejection mechanism 412 in order to illustrate the operation of the mechanism as the plug-in is inserted into and removed out of the VXI chassis. As previously discussed, the injection/ejection mechanism 412 is preferably pivotably mounted on an L-shaped bracket 438 that is, in turn, mounted to upper and lower ends of the Plug-in carrier 402. The injection/ejection mechanism 412 comprises a handle member 440 integrally attached to a pivot member 442. The pivot member 442 preferably comprises a bulb-shaped opening or hole 444 that is located centrally about the pivot point of the mechanism 412. The opening or hole 444 is sized and dimensioned to receive therein a pin or the like so that the injection/ejection mechanism 412 is pivotably mounted to the bracket 438. The pivot member 442 further includes injection and ejection protrusions 446 and 448.

The injection/ejection mechanism 412 was designed to cooperate with a frame structure (card guide rail with injector lip) 450, a portion of which is shown in FIG. 15, that is part of the standard VXI chassis, and mounted near the upper and lower ends of each slot of the chassis. The injection/ejection mechanism 412 was designed to take advantage of this feature of the chassis in order to facilitate the injection and ejection of the VXI product plug-ins. The card guide rail 450 includes an upward extending "lip" 452 near an end 454 of the rail. In FIG. 15, the spatial relationship between the lip 452 and end 454 is not to scale, but is shown in this manner to illustrate the contact points as the mechanism 412 is operated.

In operation, when the plug-in is being inserted into the chassis, the injection/ejection mechanism 412 is positioned angularly such that the injection protrusion 446 lies above the lip 452 of the rail 450. As the plug-in is further inserted into the chassis, the injection protrusion 446 moves behind the lip 452. At the same time, the plug-in connectors reach the mating connectors of the VXI backplane. The handle 440 is then moved upward so that the injection/ejection mechanism 412 rotates in a counter-clockwise direction about the pivot point 444. This action causes the injection protrusion 446 to push against the back of the lip 452 which forces the plug: in to move forward in order to position its connectors in a mating and friction fit relationship with the connectors of the VXI backplane bus. When the plug-in is to be removed, the handle 440 is rotated downward to cause the injection/ejection mechanism 412 to rotate in a clockwise direction about the pivot point 444. This action causes the ejection protrusion 448 to push against the end 454 of the rail 450 which forces the plug-in to move backward in order to remove its connectors from the mating and friction fit relationship with the connectors of the VXI backplane.

While the invention has been described in connection with various embodiments, it will be understood that the invention is capable of further modifications. This application is intended to cover any variations, uses or adaptation of the invention following, in general, the principles of the invention, and including such departures from the present disclosure as come within known and customary practice within the art to which the invention pertains.

It is claimed:

1. A VXI product plug-in comprising:
   a carrier housing having front and rear compartments, wherein said front compartment is further partitioned into upper and lower sub-compartments;
   a first set of module cards situated within the upper sub-compartment of the front compartment of the carrier housing;
   a second set of module cards situated within the lower sub-compartment of the front compartment of the carrier housing;
   at least one interfacing card situated within the rear compartment of the carrier housing for interfacing at least one of the module cards with a VXI bus;
   an internal backplane bus situated within the carrier housing and between the front and rear compartments, said internal backplane bus being coupled to said module cards and said interfacing card; and
   said plug-in being sized and dimensioned to occupy two adjacent standard slots of a standard VXI chassis.

2. The VXI product plug-in of claim 1, wherein said at least one interface card includes a mezzanine card for providing a conduit of power lines from the VXI bus to the internal backplane and for providing filtering of dc power residing in said power lines.

3. The VXI product plug-in of claim 1, wherein at least one interface card includes a controller card for decoding commands received from the VXI bus, and for producing therefrom addressing instructions for at least one of said module cards.

4. The VXI product plug-in of claim 1, wherein the first and second sets of module cards each comprise three module cards.

5. The VXI product plug-in of claim 1, wherein said internal backplane includes a bus for selectively coupling any of said module cards together.

6. The VXI product plug-in of claim 1, further comprising at least one electrically conductive sheet interposed between adjacent modules for electromagnetically isolating said adjacent modules.

7. The VXI product plug-in of claim 3, wherein the at least one interface card includes a bridge card for decoding the addressing instruction generated by the controller, and producing therefrom local addressing instructions for addressing at least one of said module cards.

8. The VXI product plug-in of claim 3, wherein at least one of said module card includes a memory device for storing software containing a descriptor representing the architecture of the module and a programming routine to be executed by a processor on the controller card so that the controller card is capable of issuing proper addressing and instruction commands for said module card.

9. A VXI based system, comprising:
   a standard VXI chassis including front and rear chassis compartments, said front chassis compartment having a plurality of standard size slots;
   a VXI backplane including a VXI bus situated within said chassis between said front and rear chassis compartments;
   a plurality of VXI product plug-ins situated within said slots, including a first plug-in configured to occupy two adjacent standard size slots;
   each said plug-in including a carrier housing having a front plug-in compartment and a rear plug-in compartment, wherein said front plug-in compartment is further partitioned into upper and lower sub-compartments;
   a first set of said module cards situated within said upper sub-compartment of said front plug-in compartment;
   a second set of said module cards situated within said lower sub-compartment of said front plug-in compartment;
   at least one interfacing card situated within said rear plug-in compartment for interfacing at least one of said module cards with a VXI bus;
   an internal backplane bus situated within said first plug-in and between said front and rear plug-in compartments, said internal backplane bus being coupled to said module cards and said interfacing card; and
   a power supply unit situated within said rear chassis compartment of said chassis for supplying power to said VXI product plug-ins.

10. The VXI based system of claim 9, wherein said at least one interface card includes a mezzanine card for providing a conduit of power lines from the VXI bus to the internal backplane and for providing filtering of dc power residing in said power lines.

11. The VXI based system of claim 9, wherein at least one interface card includes a controller card for decoding commands received from the VXI bus, and for producing therefrom addressing instructions for at least one of said module cards.

12. The VXI based system of claim 9, wherein the plug-in is sized and dimensioned to occupy two adjacent standard slots of a standard VXI chassis.

13. The VXI based system of claim 9, wherein the first and second sets of module cards each comprise three module cards.

14. The VXI based system of claim 9, wherein said internal backplane includes a bus for selectively coupling any of said module cards together.

15. The VXI based system of claim 9, further comprising at least one electrically conductive sheet interposed between adjacent modules for electromagnetically isolating said adjacent modules.

16. The VXI based system of claim 9, wherein said VXI chassis includes at least one power connector for mating with a corresponding power connector on the power supply unit.

17. The VXI based system of claim 11, wherein the at least one interface card includes a bridge card for decoding the addressing instruction generated by the controller, and producing therefrom local interface signals for addressing at least one of said module cards.

18. The VXI based system of claim 11, wherein at least one of said module card includes a memory device for storing software containing a descriptor representing the architecture of the module and a programming routine to be executed by a processor on the controller card so that the controller card is capable of issuing proper addressing and instruction commands for said one of said module card.

19. A VXI based system, comprising:

a standard VXI chassis including front and rear chassis compartments, said front chassis compartment having a plurality of standard size slots;

a VXI backplane including a VXI bus situated within said chassis between said front and rear chassis compartments;

a plurality of VXI product plug-ins situated within said slots, including a first plug-in configured to occupy two adjacent standard size slots;

said first plug-in including a carrier housing having a front plug-in compartment and a rear plug-in compartment;

said front plug-in compartment of said first plug-in including a plurality of module cards;

at least one interfacing card situated within said rear plug-in compartment for interfacing at least one of said module cards with said VXI bus of said VXI backplane;

an internal backplane bus situated within said first plug-in between said front and rear plug-in compartments, said internal backplane bus being electrically coupled to said module cards and said interfacing card; and a power supply unit situated within said rear chassis compartment of said chassis for supplying power to said VXI product plug-ins.

20. A VXI based system in accordance with claim 19, wherein said front plug-in compartment is further partitioned into upper and lower sub-compartments; a first set of said module cards being situated within said upper sub-compartment of said front plug-in compartment; and a second set of said module cards being situated within said lower sub-compartment of said front plug-in compartment.

* * * * *